United States Patent [19]
Wass et al.

[11] Patent Number: 5,495,865
[45] Date of Patent: Mar. 5, 1996

[54] TEMPERATURE RELIEF VALVE WITH THERMAL TRIGGER

[75] Inventors: Lloyd G. Wass, Eagan; Kurt L. Drewelow, Skakopee, both of Minn.

[73] Assignee: Mirada Controls, Inc., Henry, S. Dak.

[21] Appl. No.: 411,493

[22] Filed: Feb. 28, 1995

[51] Int. Cl.⁶ ................................................. F16K 17/38
[52] U.S. Cl. ...................... 137/68.3; 137/68.22; 251/38
[58] Field of Search ........................ 137/68.12, 68.22, 137/68.3, 72; 251/38

[56] References Cited

U.S. PATENT DOCUMENTS

| | | | |
|---|---|---|---|
| 1,781,027 | 11/1930 | Mapes | 137/68.22 |
| 2,230,323 | 2/1941 | Guyton | 277/67 |
| 3,001,536 | 9/1961 | Casey | 137/68 |
| 3,008,479 | 11/1961 | Mancusi, Jr. | 137/68 |
| 3,010,520 | 11/1961 | Seaberg | 169/31 |
| 3,263,929 | 8/1966 | Seablom | 239/204 |
| 3,618,627 | 11/1971 | Wagner | 137/73 |
| 3,633,596 | 1/1972 | Gerber | 137/68 |
| 3,730,204 | 5/1973 | Bissett | 137/68 |
| 3,791,450 | 2/1974 | Poitras | 169/37 |
| 3,811,457 | 5/1974 | Crossman | 137/73 |
| 3,827,449 | 8/1974 | Gurizzan et al. | 137/68.22 |
| 3,842,853 | 10/1974 | Kelly et al. | 137/75 |
| 3,896,835 | 7/1975 | Wicke | 137/75 |
| 3,906,976 | 9/1975 | Nohr et al. | 137/68 |
| 4,006,780 | 2/1977 | Zehr | 169/26 |
| 4,064,890 | 12/1977 | Collins et al. | 137/73 |
| 4,083,187 | 4/1978 | Nagashima | 60/407 |
| 4,195,745 | 4/1980 | Roberts et al. | 220/2.2 |
| 4,197,966 | 4/1980 | Wadensten et al. | 22/1 |
| 4,221,231 | 9/1980 | Harvey et al. | 137/72 |
| 4,228,858 | 10/1980 | Sclafani | 169/41 |
| 4,352,365 | 10/1982 | Bocardo et al. | 137/68 R |
| 4,430,392 | 2/1984 | Kelley et al. | 429/53 |
| 4,431,716 | 2/1984 | Eppley et al. | 429/53 |
| 4,609,005 | 9/1986 | Upchurch | 137/68.1 |
| 4,744,382 | 5/1988 | Visnic et al. | 137/68.1 |
| 4,750,510 | 6/1988 | Short, III | 137/1 |
| 4,896,690 | 1/1990 | Taylor | 137/73 |
| 4,922,944 | 5/1990 | Mueller et al. | 137/72 |
| 5,048,554 | 9/1991 | Kremer | 137/69 |
| 5,213,128 | 5/1993 | Baird | 137/73 |

FOREIGN PATENT DOCUMENTS 922433  4/1963  United Kingdom.

*Primary Examiner*—John C. Fox
*Attorney, Agent, or Firm*—Kinney & Lange

[57] ABSTRACT

A thermal relief device releases gas from a storage cylinder when a thermal trigger senses a predetermined temperature threshold. The thermal relief device includes a valve body which has a passage for communication with the interior of the cylinder. A pilot valve assembly is disposed within the valve body and has a popper for blocking the flow path. The poppet has a longitudinal passage extending through the popper. A metal diaphragm sealing the passage of the poppet has a first side exposed to the interior of the cylinder and a second side opposite the first side exposed to the outlet. A hollow bayonet is mounted in alignment with the passage of the popper on the outlet side of the disk and is moveable between a first position and a second position. In the first position, the bayonet is spaced from the disk in the passage, and in the second position the bayonet pierces the disk. A spring is used to biased the bayonet toward the disk. A thermal trigger is operably coupled to the bayonet for holding the bayonet in the first position until the thermal trigger reaches a predetermined temperature threshold. Upon reaching the predetermined temperature threshold, the thermal trigger releases the bayonet so that the bayonet moves to the second position and pierces the disk. When the disk is pierced, the popper is moved out of the flow path and gas is allowed to escape from the cylinder.

29 Claims, 8 Drawing Sheets

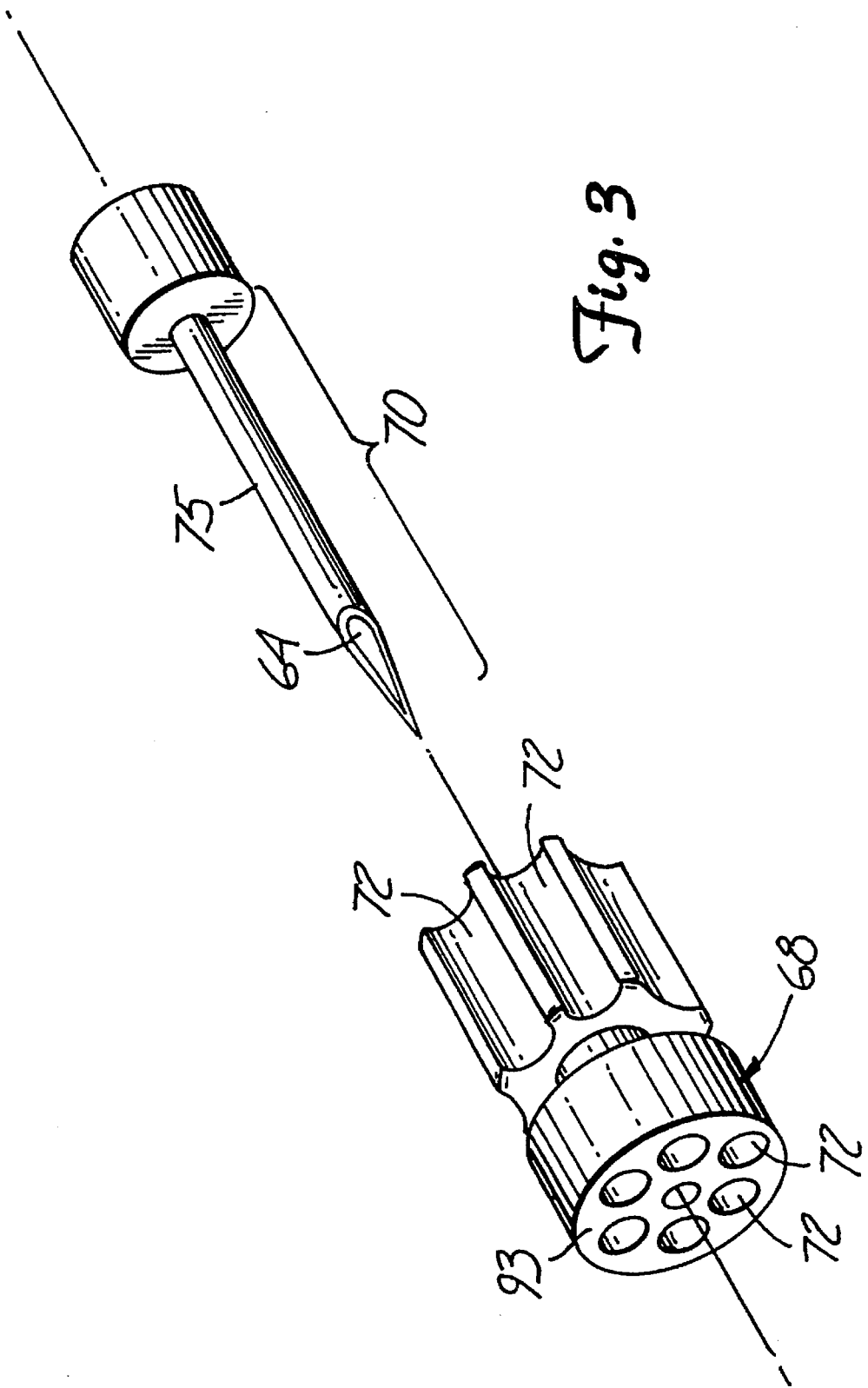

TEMPERATURE RELIEF VALVE WITH THERMAL TRIGGER

REFERENCE TO APPLICATIONS

Reference is made to U.S. pantent application Ser. No. 08/411,945, entitled THERMAL RELIEF VALVE WITH IMPROVED BAYONET by Lloyd G. Wass, filed concurrently herewith.

BACKGROUND OF THE INVENTION

The present invention relates to a relief valve. In particular, the present invention relates to a thermally activated relief valve for use with a compressed gas storage cylinder (or pressure vessel).

It is desirable for some compressed gas storage cylinders to have safety valves such as a thermal relief device (TRD). For example, cylinders which hold compressed natural gas are required by law to have such relief valves.

The advance of high pressure composite technology has made it feasible and economically attractive to expand the size and pressure capabilities of storage cylinders for compressed natural gas used in vehicular applications. These new design, light weight, composite cylinders are typically constructed using a thin wall metal or plastic liner which is overwrapped with multiple layers of fiberglass/epoxy resin or graphite fiber/epoxy resin. In either case, the majority of the cylinders' burst strength is provided by the fiberglass or graphite/resin overwrap. Because the overwrap material is more susceptible to damage in a fire than metal, this cylinder design is more vulnerable to fire than conventional all-metal storage cylinders.

To adequately protect these "space age" cylinders from wrap strength degradation in a fire, the cylinders must be protected/fitted with high flow, fast acting, thermal relief safety devices. It should be noted that older style thermal devices (either open throat or convoluted/mazed) do not function (activate) consistently in these applications because the relatively cold stored gas inside the "insulated" cylinder cools the flow blocking eutectic mix as the gas begins to exit. This causes the eutectic to "re-freeze" and block the gas exit path. In this scenario, the fire causes the outer wall temperature of the cylinder to continue to escalate, while the eutectic safety device goes through a succession of freeze/thaw (melt) cycles during which time (typically 8–12 minutes) very limited amounts of compressed gas are released. This situation leaves the cylinder very vulnerable to catastrophic failure because of the cylinders' reduced burst strength.

There is, therefore, a need for a relief valve which meets or exceeds all of the critical performance criteria necessary for these newer cylinder designs. Such a relief valve must satisfy the following conditions:

(1) Fast Action - Typical fire activation time of 2–3 minutes is needed to allow compressed gas to begin venting before the overwrapped cylinder's burst strength is significantly reduced.

(2) Very High Reliability - The design must have the following features to assure high reliability:

(a) The relatively cool exiting gas stream can not resolidify the eutectic to possibly cause a catastrophic failure due to delayed activation.

(b) Cylinder gas pressure can not exert an "extruding" force on the eutectic when the eutectic becomes susceptible to "plastic flow" (creep) as the system temperature approaches/encroaches on the eutectic melt temperature (during routine operation).

(3) Relatively High Flow - The relief valve must open a relatively large exhaust port to achieve high flow (exhaust) rates.

SUMMARY OF THE INVENTION

A thermal relief device releases gas from a storage cylinder when a thermal trigger senses a predetermined temperature threshold. The thermal relief device includes a valve body which has a flow path with an inlet for communication with the interior of the cylinder and an outlet. A pilot valve assembly is disposed within the valve body and has a poppet for blocking the flow path. The poppet has a longitudinal passage extending through the poppet. A thin disk is disposed within the passage of the poppet, sealing the passage. For thermal activation, a spring-biased small hollow bayonet is mounted in alignment with the passage of the poppet between the poppet and the outlet and is moveable between a first position and a second position. In the first position, the bayonet is spaced from the disk in the passage, and in the second position the bayonet pierces the disk. A thermal trigger, disposed generally between the poppet and the outlet, holds the bayonet in the first position as long as the ambient temperature remains below the predetermined temperature threshold. When the ambient temperature reaches the predetermined temperature threshold, the thermal trigger releases the bayonet, thereby allowing it to move to the second position. When the seal in the passage of the poppet is interrupted and the passage of the poppet is exposed, the poppet is forced out of the flow path and gas is allowed to escape from the cylinder.

BRIEF DESCRIPTION OF THE DRAWINGS

FIG. 3 is an enlarged perspective view of the bayonet assembly of the present invention.

DETAILED DESCRIPTION OF THE PREFERRED EMBODIMENTS

Figure 1:
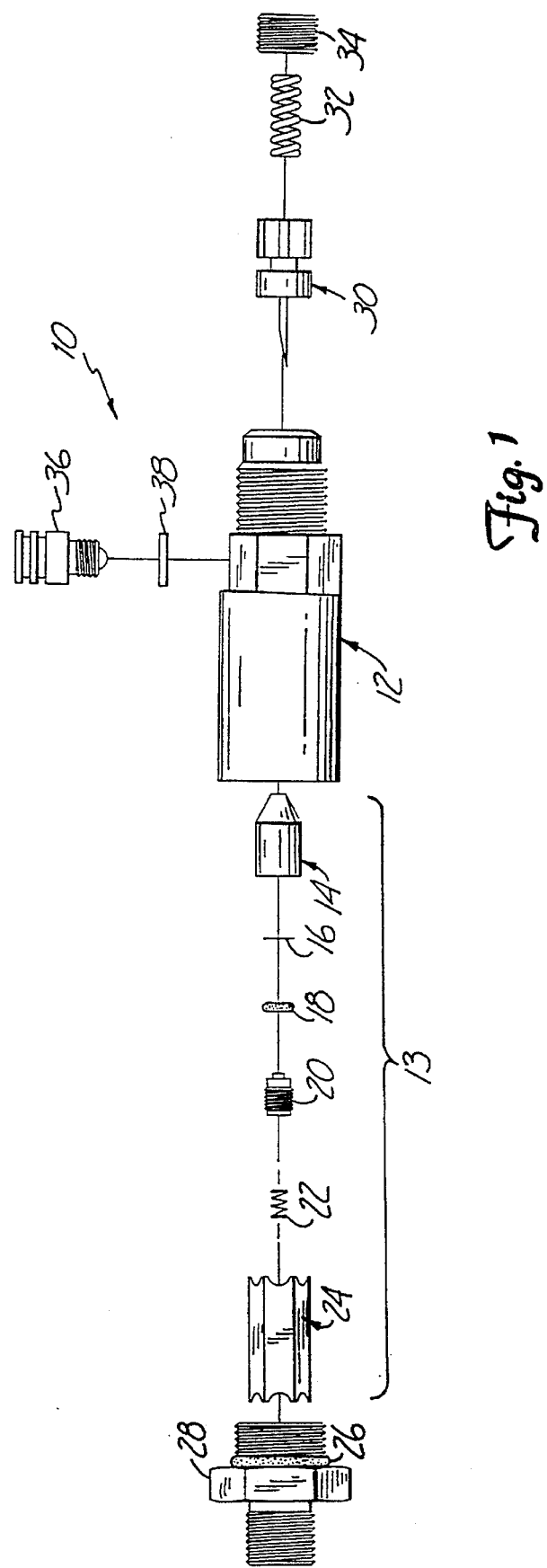
FIG. 1 is an exploded view showing the thermally activated relief valve of the present invention.

FIG. 1 is an exploded view of pressure relief valve 10 of the present invention. Relief valve 10 includes valve body 12, poppet assembly 13 (including shuttle poppet 14, seal 16, O-ring 18, poppet insert 20, poppet spring 22, and poppet cage 24), O-ring 26, and torque plug 28. Relief valve 10 also includes bayonet assembly 30, bayonet spring 32, retainer 34, thermally activated trigger 36 and spacer 38. The components of relief valve 10 are shown in section and partially assembled in FIG. 2.

Figure 2:
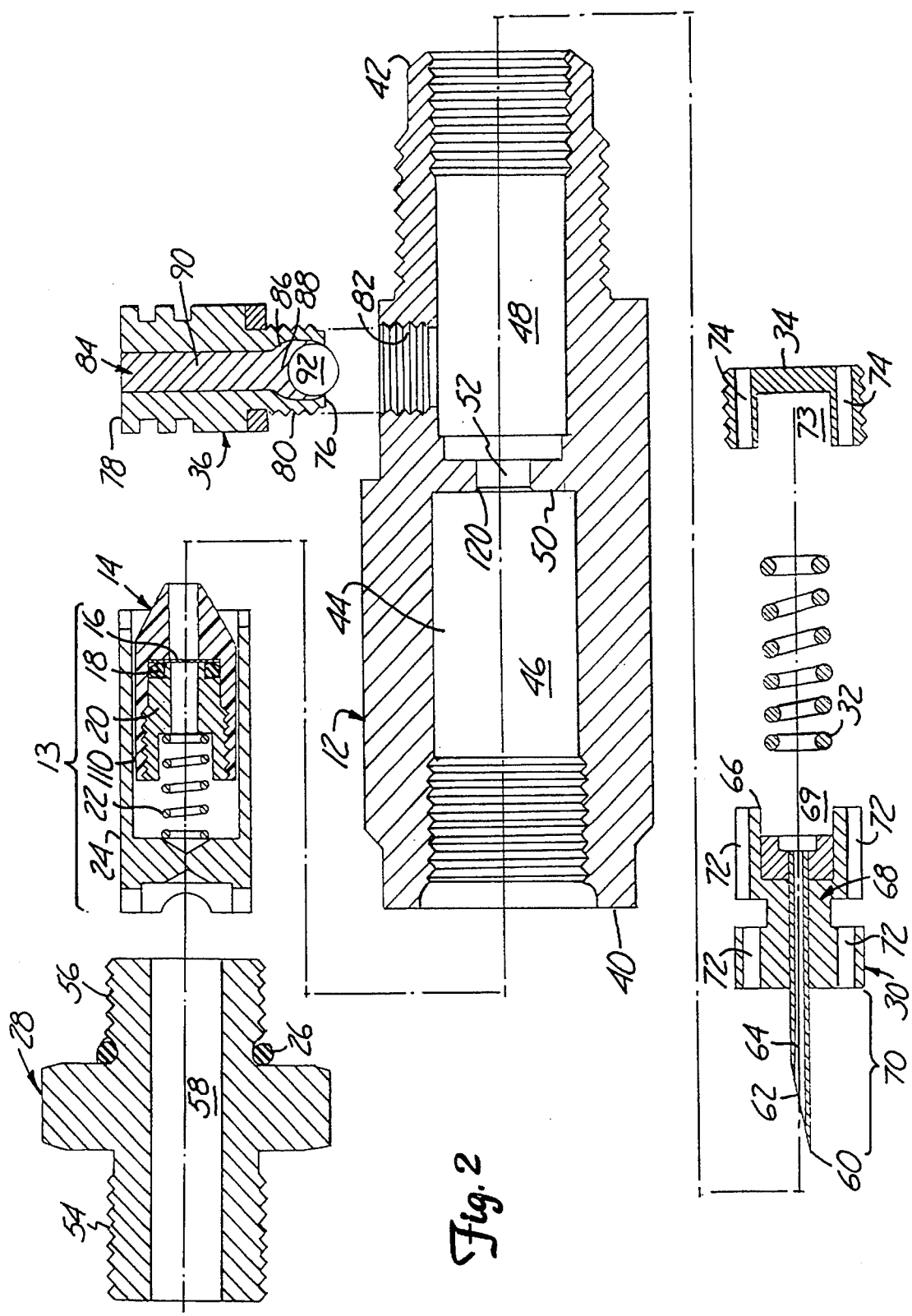
FIG. 2 is an exploded view showing the thermally activated relief valve of the present invention in cross-section.

As best seen in FIG. 2, valve body 12 has a first end 40 and a second end 42. A longitudinal bore 44 extends through valve body 12 from first end 40 to second end 42. The longitudinal bore 44 has a first portion 46 adjacent first end 40, and a second portion 48 adjacent second end 42. First portion 46 and second portion 48 of longitudinal bore 44 are separated by radial shoulder 50 within longitudinal bore 44. Shoulder 50 defines orifice 52 between first portion 46 and second portion 48 of longitudinal bore 44. First portion 46 of longitudinal bore 44 is sized to slidably receive poppet assembly 13, and second portion 48 is sized to slidably receive bayonet assembly 30 and bayonet spring 32. Poppet assembly 13 is retained in first portion 46 of bore 44 by torque plug 28, while bayonet assembly 30 and bayonet spring 32 are retained in second portion 48 of bore 44 by retainer 34.

Torque plug 28 includes threaded first end 54 and threaded second end 56. Passage 58 extends longitudinally through torque plug 28 from first end 54 to second end 56. Threaded first end 54 is provided so that torque plug 28 can be threaded into a threaded opening in a compressed gas storage cylinder. Threaded second end 56 engages first end 40 of valve body 12 such that O-ring 26 is compressed between valve body 12 and torque plug 28. When second end 56 of torque plug 28 is fully threaded into first end 40 of valve body 12, poppet assembly 13 is held securely in first portion 46 of longitudinal bore 44, such that shuttle poppet 14 is biased against orifice 52 by poppet spring 22. (Shown in FIG. 4 and described below).

Bayonet assembly 30 has a first end 60. First end 60 is formed at an angle to make a cutting surface 62. Bayonet assembly 30 also has a passage 64 which extends from first end 62 to second end 66. Passage 64 is generally aligned with the longitudinal axis of bayonet assembly 30. Bayonet assembly 30 is also provided with body 68. Bayonet body 68 has a diameter which is slightly smaller than the diameter of second portion 48 of bore 44 such that body 68 is capable of sliding freely within bore 44. However, the diameter of bayonet body 68 is larger than the diameter of orifice 52 such that bayonet body 68 can not pass through orifice 52. Portion 70 of bayonet assembly 30 which is between first end 60 and body 68 has a diameter which is smaller than the diameter of orifice 52 such that portion 70 may pass through orifice 52, leaving space 71 (best seen in FIGS. 4–6) between portion 70 and shoulder 50 such that orifice 52 is not completely blocked by portion 70. Bayonet body 68 further includes recess 69 for receiving bayonet spring 32 and a plurality of passages 72 extending through body 68. Passages 72 are generally parallel with the longitudinal axis of bayonet assembly 30 and function to allow compressed gas to pass bayonet assembly 30. Passages 72 may be formed as longitudinal bores through body 68, as grooves on the surface of body 68, or as a combination of bores and grooves.

In a preferred embodiment and as best seen in FIG. 3, portion 70 of bayonet assembly 30 is a hollow needle 75 which has been press-fit into body 68. Hollow needle 75 is preferably a 16 gauge hypodermic needle (such as that commonly used by veterinarians) to provide the preferred diameter of passage 64. After the hollow needle 75 is press-fit into body 60, recess 69 is formed by drilling to provide a receiving site for bayonet spring 32.

As shown in FIG. 2, bayonet assembly 30 is retained in second portion 48 of bore 44 by retainer 34 which threadably engages second end 42 of valve body 12. Retainer 34 includes a recess 73 for receiving bayonet spring 32 and a plurality of passages 74 extending through retainer 34 in a direction generally aligned with the longitudinal axis of bayonet assembly 30. Passages 74 allow compressed gas which has passed by bayonet assembly 30 to exit valve 10.

Thermal trigger 36 has a first end 76 and a second end 78. First end 76 is provided with a threaded exterior 80 which is sized to permit threading into threaded opening 82 in valve body 12. Thermal trigger 36 has a channel 84 extending generally along its longitudinal axis from first end 76 to second end 78. Shoulder 86 divides the channel 84 generally into a first channel 88 and a second channel 90. Thermal trigger 36 is also provided with ball bearing 92 sized to permit insertion into first channel 88. However, ball bearing 92 is large enough that it abuts shoulder 86 and cannot pass into second channel 90. During operation of the valve, when ball bearing 92 abuts shoulder 86, ball bearing 92 functions as a check valve, preventing pressurized gas from passing through channel 84.

In a preferred embodiment, first channel 88 is formed with a taper at first end 76 (e.g., by swaging) so that ball bearing 92 is lightly captured in first channel 88 between first end 76 and shoulder 86, but allowed to partially extend beyond first end 76. This prevents the eutectic material which fills channels 88 and 90 from forcing ball bearing 92 out of first channel 88 or leaking past ball bearing 92 during filling of channels 88 and 90. It also assures a consistent positioning of ball bearing 92 and prevents ball bearing 92 from floating in the heaver eutectic material. The eutectic material filling channels 88 and 90 is commonly known in the art and is selected according to the desired predetermined temperature threshold.

Figure 2A:
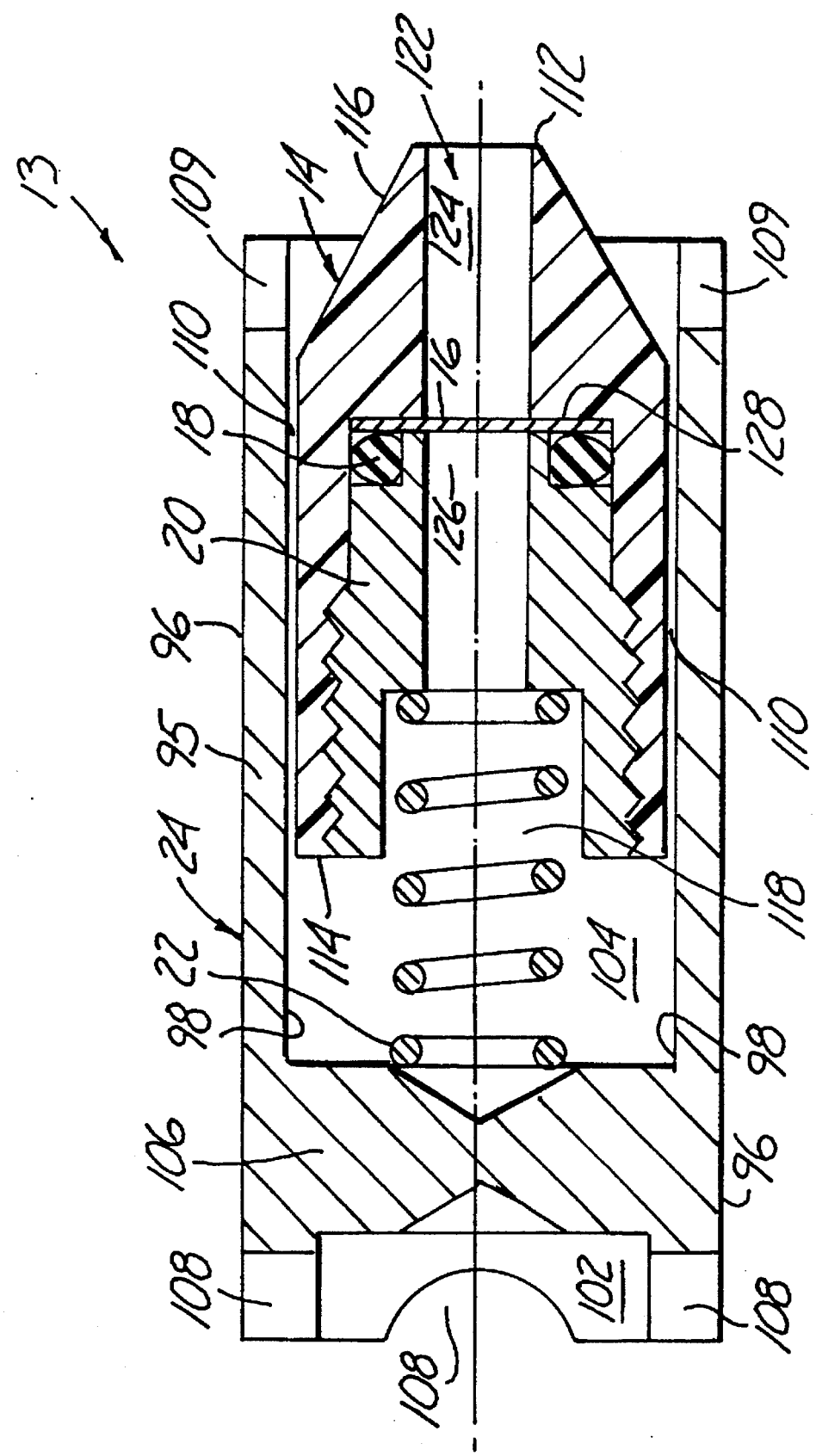
FIG. 2A is an enlarged cross-sectional view of the poppet assembly of the present invention.

As described above, poppet assembly 13 comprises shuttle poppet 14, seal 16, O-ring 18, poppet insert 20, poppet spring 22 and popper cage 24. Poppet assembly 13 is shown in its assembled condition in FIG. 2 and FIG. 2A where FIG. 2A shows an enlarged view of poppet assembly 13 for ease of viewing. Poppet cage 24 has a circumferential wall 95 with an exterior surface 96 and an interior surface 98. Poppet cage 24 is sized so that it may be slidably received into first portion 46 of bore 44. Preferably, exterior surface 96 of poppet cage 24 has a non-circular cross-section such that a plurality of passages 100 are created between external surface 96 and valve body 12 (best seen in FIG. 4A).

As shown in FIG. 2A, poppet cage 24 includes first interior portion 102 and second interior portion 104. First interior portion 102 and second interior portion 104 are separated by wall 106. Interior portion 102 and interior portion 104 have openings or passages 108 and 109, respectively, which allow interior portions 102 and 104 to communicate with passages 100 adjacent exterior surface 96 (shown in FIG. 4 and 4A). First interior portion 102 is positioned adjacent passage 58 of torque plug 28 and functions to direct compressed gas entering release valve 10 through passage 58 toward passages 100 between poppet cage 24 and valve body 12. Compressed gas flowing through passage 58 enters first interior portion 102 of poppet cage 24 and is directed radially from interior portion 102 through openings 108 into passages 100. Gas is then directed from passages 100 through openings 109 into second interior portion 104.

Second interior portion 104 of poppet cage 24 is adapted to slidably receive shuttle poppet 14 and poppet spring 22. Interior surface 98 of poppet cage 24 preferably has a circular cross-section to match the shape of shuttle poppet 14. The diameter of shuttle poppet 14 is slightly less than the diameter of second interior portion 104 so as to create passage 110 between shuttle poppet 14 and interior wall 98.

Shuttle poppet 14 has a first end 112 and a second end 114. First end 112 is adapted to sealably engage orifice 52. First end 112 preferably has conically shaped surface 116 to provide an adequate seal with orifice 52. Shuttle poppet 14 further includes a longitudinal bore 122, which extends from first end 112 to second end 114 of shuttle poppet 14. Bore 122 includes first narrow portion 124 and second wider portion 126. The transition from narrow portion 124 and wider portion 126 defines a radial shoulder 128, which faces wider portion 126. Wider portion 126 is provided with internal threads for the purpose of engaging external threads of poppet insert 120. Narrow portion 124 is adjacent first end 112 and is of a diameter slightly larger than the diameter of portion 70 of bayonet assembly 30 such that portion 70 of bayonet assembly 30 may pass freely through narrow portion 124 of bore 122 (as shown in FIGS. 4–6 and described below).

As seen in FIG. 2A, seal 16 is positioned within wider portion 126 against radial shoulder 128. Poppet insert 20 is then threaded into wider portion 126 of shuttle poppet 14 such that O-ring 18 and seal 16 are secured against radial shoulder 128, thereby sealing longitudinal bore 122. Seal 16 is preferably formed of a material resistant to corrosion, such as stainless steel, Inconel, or Monel. In a preferred embodiment, seal 16 has a thickness of about 0.0003 inches (3 mil.). The preferred thickness of 0.0003 inches provides an overpressure burst strength of about 9000 pounds per square inch. It is contemplated that the thickness of seal 16 may be selected to provide any desired burst strength.

Poppet insert 20 includes recess 130 which is of size sufficient to receive poppet spring 22. Poppet spring 22 is thus positioned between wall 106 and second end 114 of shuttle poppet 14. When poppet assembly 13 is assembled and slidably inserted into first portion 46 of bore 44, conical surface 116 of first end 112 of shuttle poppet 14 is urged into sealing engagement of orifice 52 by poppet spring 22. So assembled, a hollow area 118 is formed adjacent second end 114 of shuttle poppet 14. Preferably, poppet spring 22 provides a force against shuttle poppet 14 of magnitude just sufficient to seal orifice 52, because after the storage cylinder is pressurized the force of the compressed gas will hold shuttle poppet 14 in sealing engagement with orifice 52. Preferably, the force exerted by poppet spring 22 is less than 2 pounds.

Figure 4:
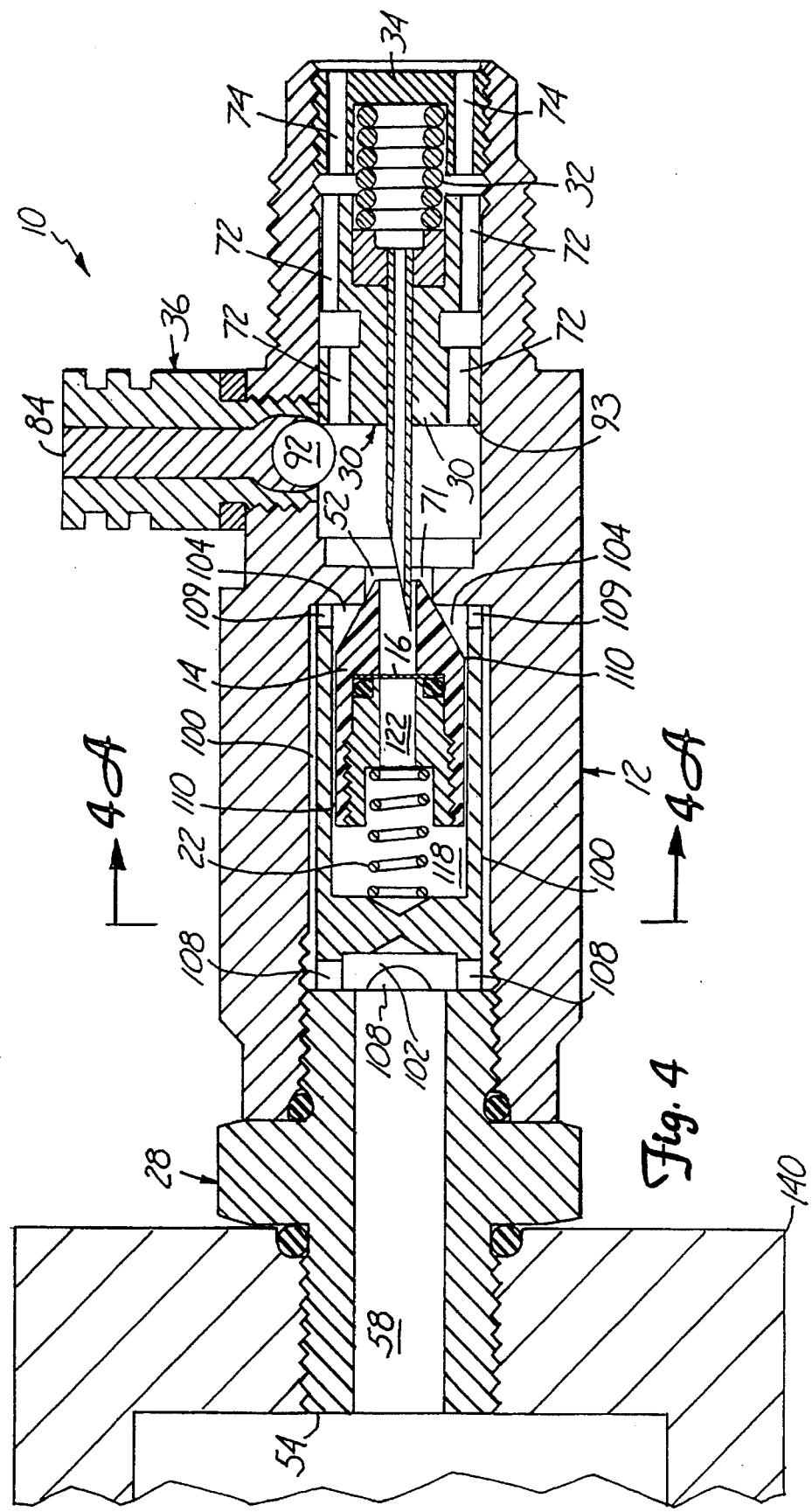
FIG. 4 is a cross-sectional view of the thermally activated relief valve of the present invention prior to activation.
Figure 4A:
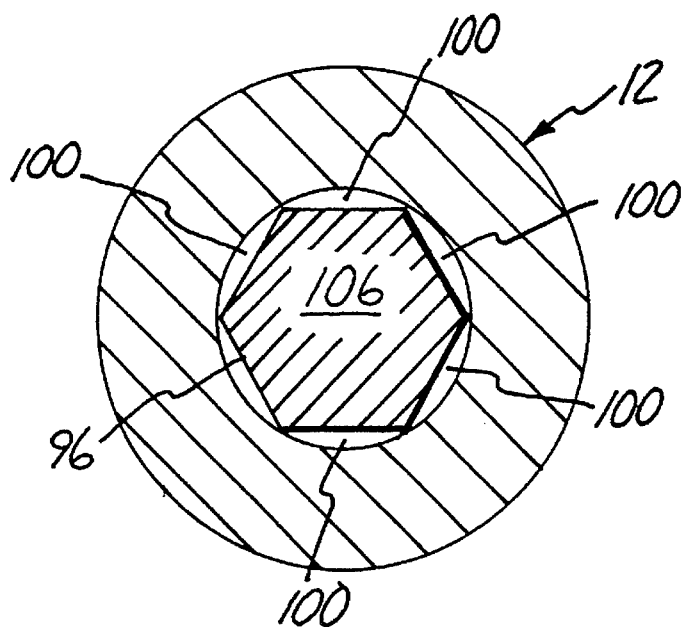
FIG. 4A is a cross-sectional view taken along lines 4A—4A of FIG. 4 of the present invention.
Figure 5:
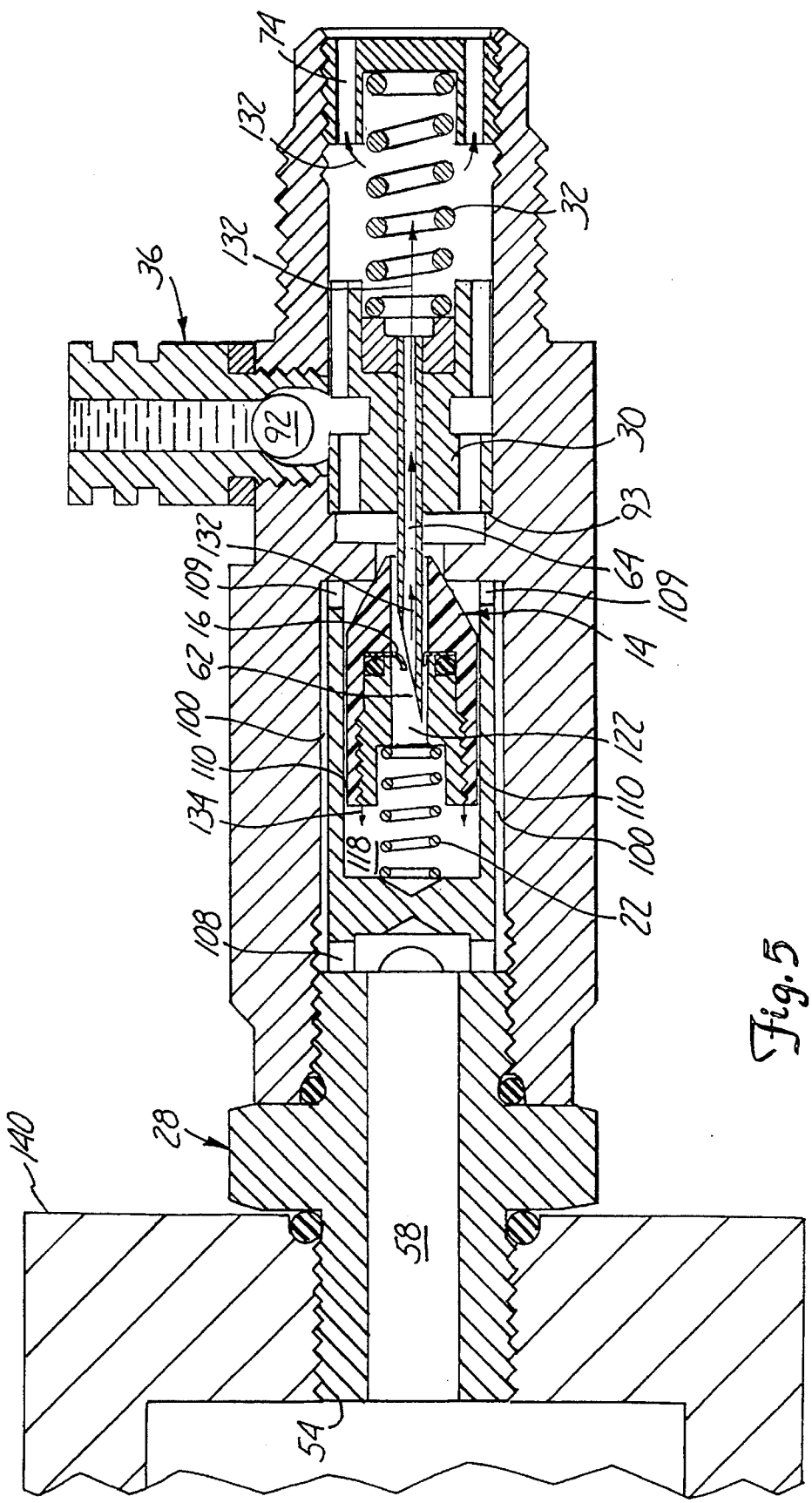
FIG. 5 is a cross-sectional view of the thermally activated relief valve of the present invention immediately after activation.
Figure 6:
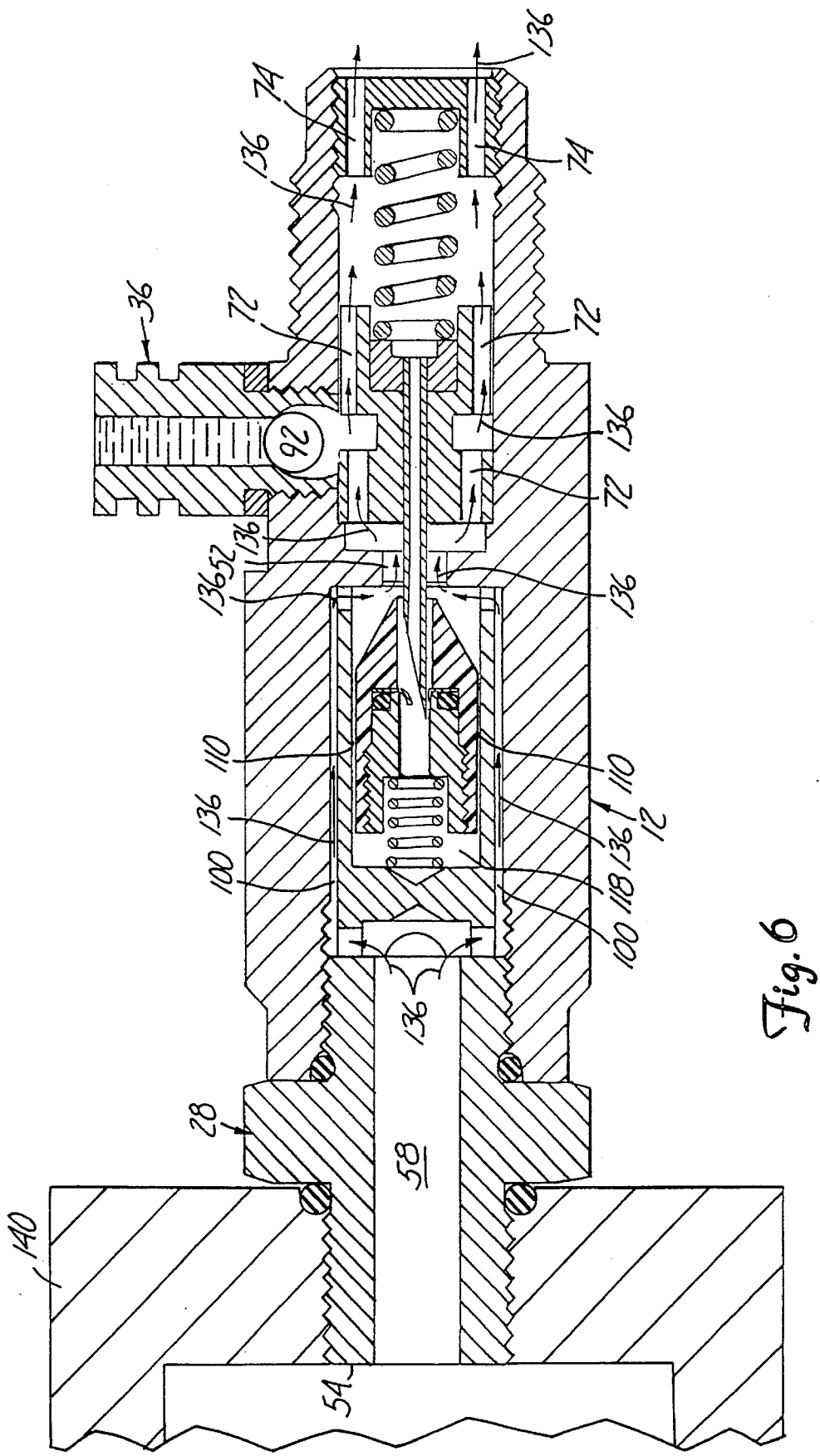
FIG. 6 is a cross-sectional view of the thermally activated relief valve of the present invention after activation and opening of the orifice.

For a better illustration of the operation of relief valve 10, FIGS. 4–6 show a cross-sectional view of relief valve 10 of the present invention in assembled form. In FIGS. 4–6, first end 54 of torque plug 28 is shown threaded into an opening in compressed gas storage cylinder 140. There is a passage extending generally along the longitudinal axis of the assembled relief valve 10 starting from passage 58 of torque plug 28, into first interior portion 102 of poppet cage 24, through openings 108 into passages 100, through openings 109 into second interior portion 104, through orifice 52, through passages 72 of body 68, and extending through passages 74 of retainer 34. The passage is in communication with an interior of cylinder 140 and is blocked by seal 16 and by the sealing engagement between shuttle poppet 14 and orifice 52.

It should be noted that while relief valve 10 is depicted as being directly connected to cylinder 140, it is contemplated that relief valve 10 could alternatively be in fluid communication with the interior of cylinder 140 in any other manner. For instance, relief valve 10 could be mounted to cylinder 140 via a fill valve (not shown).

Initially, storage cylinder 140 is void of compressed gas. As cylinder 140 is filled with gas, the gas also enters relief valve 10. As compressed gas enters relief valve 10, the gas passes through passage 58 in torque plug 28 into first portion 102 of poppet cage 24. The compressed gas then flows through openings 108 and into passages 100 around poppet cage 24. The gas is then directed through openings 109 toward first end 112 of shuttle poppet 14. As the compressed gas approaches first end 112 of shuttle poppet 14, the gas is directed through passage 110 between shuttle poppet 14 and poppet cage 24 to hollow area 118. The gas is directed through passage 110 and not through orifice 52 because poppet spring 22 has urged first end 112 of shuttle poppet 14 into sealing engagement with orifice 52. The compressed gas enters longitudinal bore 122 of shuttle poppet 14 until it encounters seal 16. Because the gas cannot escape (due to seal 16 and the sealing engagement between shuttle poppet 14 and orifice 52) the pressure continues to build in area 118 as gas is added to cylinder 140. The pressure in hollow area 118 aids poppet spring 22 in urging shuttle poppet 14 into sealing engagement with orifice 52.

Figure 4B:
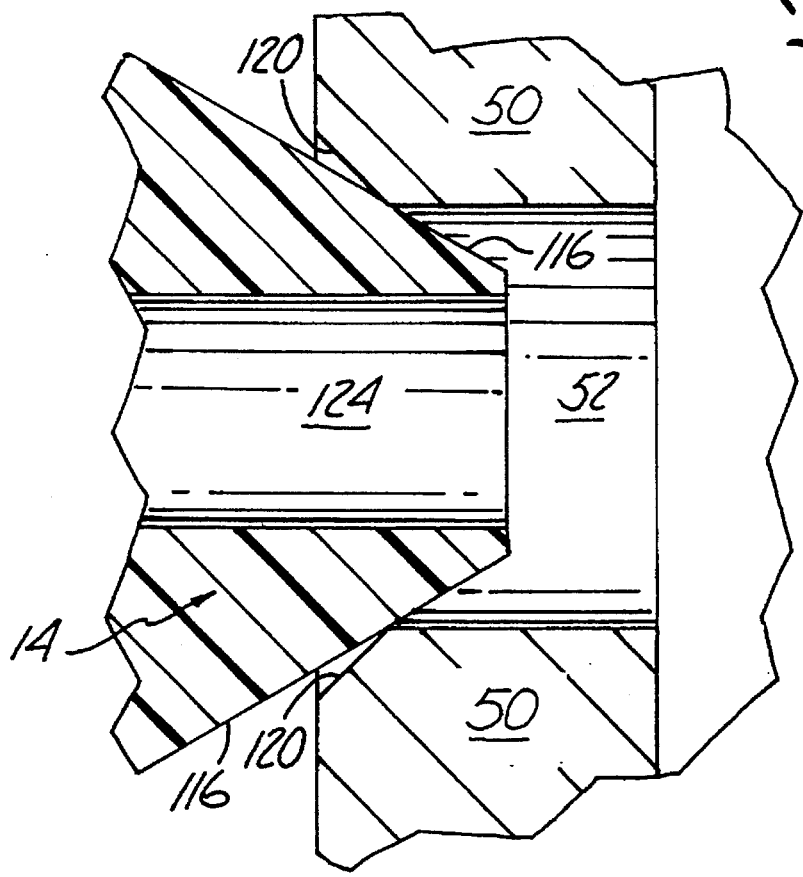
FIG. 4B is an enlarged fragmented cross-sectional view of the shuttle poppet and orifice of the present invention.

In operation, valve 10 is assembled as shown in FIG. 4 with bayonet spring 32 compressed and with shoulder 93 of bayonet assembly 30 moved back into alignment with ball bearing 92 of thermal trigger 36. Shuttle poppet 14 is urged into sealing communication with orifice 52 by poppet spring 22 and the pressure of compressed gas in hollow area 118. Preferably, conical surface 116 of poppet 14 has an included angle of approximately 60 degrees and mating surface 120 of orifice 52 has approximately a 45 degree angle (best seen in FIG. 4B). The slight difference in angles between surfaces 116 and 120 aids in creating a seal between shuttle poppet 14 and orifice 52. Preferably, shuttle poppet 14 is made from a material which is resistant to heat and chemicals and which is soft enough to form a secure seal with orifice 52 but not so soft as to deform and cause shuttle poppet 14 to wedge within orifice 52. In the preferred embodiment, shuttle poppet 14 is formed from polyetheretherketone (PEEK).

As previously discussed, channel 84 in trigger 36 is filled with eutectic material such that the ball bearing 92 is held securely in place in a partially extended position. When threaded exterior 80 of first end 76 of thermal trigger 36 is threaded into opening 82 of valve body 12, and when bayonet spring 32 is compressed between body 68 of bayonet assembly 30 and retainer 34, shoulder 93 of body 68 is in general alignment with thermal trigger 36 such that ball bearing 92 can come to rest against shoulder 93 of bayonet body 68. Spacer 38 may be used to properly position ball bearing 92 against shoulder 93. Thus, ball bearing 92 holds bayonet assembly 30 that holds bayonet spring 32 in its compressed position between bayonet assembly 30 and retainer 34.

The pressure exerted by bayonet spring 32 against bayonet assembly 30 causes an upward force to be exerted by shoulder 93 of bayonet assembly 30 against ball bearing 92. When the eutectic substance reaches its melting temperature (i.e., the predetermined temperature threshold), it liquifies. In its liquid state, the eutectic substance no longer holds ball bearing 92 securely against shoulder 93. FIG. 5 shows that the upward force exerted on ball bearing 92 by bayonet spring 32 causes ball bearing 92 to move into channel 88 and away from shoulder 93 of bayonet assembly 30. This allows bayonet spring 32 to expand and push against second end 66 of bayonet assembly 30, thereby driving cutting surface 62 of bayonet assembly 30 through seal 16. Preferably, the force exerted by bayonet spring 32 on bayonet assembly 30 is just sufficient to allow seal 16 to be pierced by cutting surface 62. In the preferred embodiment, bayonet spring 32 exerts a force of less than about 10 pounds on bayonet assembly 30.

It is desired to minimize the force exerted by spring 32 so that the corresponding force exerted on ball bearing 92 is also minimized. Minimizing the force exerted on ball bearing 92 reduces the possibility that the eutectic material will undergo plastic flow or creep from trigger 36 and thus reduces the possibility of an erroneous or premature activation of relief valve 10. A reduced force exerted on ball bearing 92 also allows trigger 36 to be activated more closely to the melting temperature of the eutectic material, because there is less force urging the material from trigger 36.

In the present invention, the force exerted by bayonet spring 32 is minimized by minimizing the size of the flow path which bayonet assembly 30 is required to open. In particular, bayonet assembly 30 is required to pierce seal 16 to open a relatively small passage 122 in shuttle poppet 14. Seal 16 functions as a pilot valve controlling the opening of a much larger flow path through orifice 52. By piercing seal 16, bayonet assembly 30 opens the passage 122 in shuttle poppet 14 and allows compressed gas in hollow area 118 to pass through passage 64 in bayonet assembly 30 and then through passages 74 in retainer 34. Arrows 132 in FIG. 5 depict the flow path of compressed gas leaving area 118 through passage 64 after seal 16 has been pierced. Passage 64 and passage 110 (between shuttle poppet 14 and poppet cage 24) are sized such that as the compressed gas in hollow area 118 is vented through passage 64, compressed gas from cylinder 140 cannot pass into hollow area 118 through passage 110 faster than gas is vented from hollow area 118 through passage 64. Therefore, the pressure in hollow area 118 becomes less than the pressure exerted on shuttle poppet 14 near first end 112. The pressure differential between hollow area 118 and the area adjacent first end 112 of shuttle poppet 14 allows the compressed gas adjacent first end 112 to overcome the force exerted by poppet spring 22 and force shuttle poppet 14 in the direction of arrow 134 in FIG. 5, thereby exposing the orifice 52.

As depicted by arrows 136 in FIG. 6, as shuttle poppet 14 is moved away from orifice 52, compressed gas flows through orifice 52, through passages 72 in body 68 of bayonet assembly 30 and finally through passages 74 in retainer 34.

Shuttle poppet 14 remains in its open position (away from orifice 52) so long as the pressure of the gas in storage cylinder 140 is large enough to compress poppet spring 22. Any gas which enters hollow area 118 continues to be vented through passage 64 of bayonet assembly 30 faster than gas can enter hollow area 118 through passage 110, thereby maintaining the required pressure differential between hollow area 118 and first end 112 of shuttle poppet 14.

In other embodiments of the present invention, seal 16 may also act as an over-pressure rupture disk, as well as a puncturable seal for the thermal relief function of valve 10. The thickness of seal 16 may be selected such that seal 16 ruptures when the pressure in cylinder 140 reaches a predetermined pressure level.

The invention described herein meets or exceeds all of the critical performance criteria necessary for the newer overwrapped cylinder designs by utilizing the following design features/configurations:

(1) Fast Action - Typical fire activation time of 2-3 minutes is achieved by using a very small amount of eutectic in a "trigger" configuration.
(2) Very High Reliability - This design totally isolates the eutectic trigger from the compressed cylinder gas and, as a result, offers two (2) distinct benefits:
 (a) The relatively cool exiting gas stream can not resolidify any eutectic in the exit passage to possibly cause a catastrophic failure due to delayed activation.
 (b) Cylinder gas pressure can not exert an "extruding" force on the eutectic when the eutectic becomes susceptible to "plastic flow" (creep) as the system temperature approaches/encroaches on the eutectic melt temperature.
(3) Relatively High Flow - Use of a "hybrid" puncture disk pilot type valve enables the triggering mechanism to open a relatively large exhaust port to achieve high flow (exhaust) rates.
(4) Very Low (constant) Spring Load - This design offers the advantage of an unusually low force load (under ten pounds) on a eutectic trigger. This is a highly desirable feature/characteristic that enables this device to remain stable at encroachment temperatures very close to the eutectic melt temperatures, without premature or false activation.

Because the size of this device is not limited by eutectic creep problems, much larger flow rates can be designed to meet the safety requirements of larger gas storage cylinders and permit optimization of larger fuel systems.

Although the present invention has been described with reference to preferred embodiments, workers skilled in the art will recognize that changes may be made in form and detail without departing from the spirit and scope of the invention.

What is claimed is:

1. A pressure relief valve for use with a receptacle containing compressed gas, the pressure relief valve comprising:
 a valve body having an inlet, an outlet and a flow path between the inlet and the outlet, the valve body configured to be connectable to the receptacle so that the inlet is in communication with an interior of the receptacle, the flow path being configured to define an orifice within the valve body, the orifice having a longitudinal axis and a diameter;
 a poppet valve assembly comprising:
  a poppet within the flow path adjacent to the inlet, the poppet having a first end oriented toward the orifice, a second end opposite the first end, a longitudinal axis and a longitudinal passage extending from the first end to the second end;
  first bias means in operable association with the poppet for biasing the first end of the poppet toward the orifice; and
  a seal in the longitudinal passage;
 a movable member within the flow path adjacent the outlet, the movable member being coaxially aligned with the orifice and the longitudinal passage of the poppet, the movable member being movable from a first position to a second position;
 second bias means in operable association with the movable member for biasing the movable member toward the second position; and
 a thermally responsive restraining member operably coupled with the movable member, the restraining member holding the movable member in the first position when ambient temperature is below a predetermined temperature threshold, the restraining member releasing the movable member when the ambient temperature is above the predetermined temperature threshold so as to allow the movable member to move to the second position to interrupt the seal in the passage of the poppet and thereby expose the flow path.

2. The pressure relief valve of claim 1, wherein the restraining member comprises a trigger housing having an inner chamber, a detent movable within the inner chamber of the trigger housing, and a thermally sensitive eutectic substance in the inner chamber of the trigger housing, wherein when its temperature is below the predetermined temperature threshold the eutectic substance biases the detent against the movable member, and wherein when its temperature reaches the predetermined temperature threshold the detent is allowed to move within the inner chamber of the trigger housing away from the movable member.

3. The pressure relief valve of claim 1, wherein the movable member comprises a cutting member and a cutting member carder connected to the cutting member, the cutting member configured to pierce the seal in the longitudinal passage.

4. The pressure relief valve of claim 3, wherein the cutting member is a hollow cutting member.

5. The pressure relief valve of claim 4, wherein the hollow cutting member is a 16 gauge needle.

6. The pressure relief valve of claim 1, wherein the second bias means is a spring capable of exerting a force of less than about 10 pounds.

7. The pressure relief valve of claim 1, wherein the poppet is formed of polyetheretherketone.

8. The pressure relief valve of claim 1, wherein the poppet includes a radially tapered outer surface, the radially tapered outer surface having a first outer diameter larger than the diameter of the orifice and a second outer diameter smaller than the diameter of the orifice, the first outer diameter of the poppet capable of engaging and blocking the orifice.

9. The pressure relief valve of claim 8, wherein the radially tapered outer surface defines an angle of about 60 degrees relative to the longitudinal axis of the poppet.

10. The pressure relief valve of claim 8, wherein the orifice is defined by a radial shoulder within the flow path.

11. The pressure relief valve of claim 10, wherein the radial shoulder has a chamfered edge.

12. The pressure relief valve of claim 11, wherein the chamfered edge defines an angle of about 45 degrees relative to the longitudinal axis of the orifice.

13. The pressure relief valve of claim 1, wherein the seal in the longitudinal passage is a frangible membrane.

14. A pressure relief valve for use with a receptacle containing compressed gas, the pressure relief valve comprising:

a first valve body having an inlet, an outlet and a flow path between the inlet and the outlet, the first valve body configured to be connectable to the receptacle so that the inlet is in communication with an interior of the receptacle, the flow path of the first valve body being configured to define an orifice within the first valve body, the orifice having a longitudinal axis and a diameter;

a second valve body having a first end, a second end opposite the first end, a longitudinal axis and a longitudinal passage extending from the first end to the second end, the longitudinal passage defining a secondary flow path, the second valve body positioned in the flow path of the first valve body such that the first end of the second valve body sealingly engages the orifice of the first valve body;

a seal in the longitudinal passage of the second valve body, the seal blocking the secondary flow path;

a movable member within the flow path of the first valve body adjacent the outlet, the movable member being coaxially aligned with the orifice and the longitudinal passage of the second valve body, the movable member being movable from a first position to a second position;

bias means in operable association with the movable member for biasing the movable member toward the second position; and a thermally responsive restraining member operably coupled with the movable member, the restraining member holding the movable member in the first position when ambient temperature is below a predetermined temperature threshold, the restraining member releasing the movable member when the ambient temperature is above the predetermined temperature threshold so as to allow the movable member to move to the second position to interrupt the seal in the longitudinal passage of the second valve body and thereby expose the secondary flow path, wherein exposure of the secondary flow path interrupts the seal between the second valve body and the orifice to expose the flow path of the first valve body.

15. The pressure relief valve of claim 14, wherein the restraining member comprises a trigger housing having an inner chamber, a detent movable within the inner chamber of the trigger housing, and a thermally sensitive eutectic substance in the inner chamber of the trigger housing, wherein when its temperature is below the predetermined temperature threshold the eutectic substance biases the detent against the movable member, and wherein when its temperature reaches the predetermined temperature threshold the detent is allowed to move within the inner chamber of the trigger housing away from the movable member.

16. The pressure relief valve of claim 14, wherein the movable member comprises a cutting member and a cutting member carrier connected to the cutting member, the cutting member configured to pierce the seal in the longitudinal passage.

17. The pressure relief valve of claim 16, wherein the cutting member is a hollow cutting member.

18. The pressure relief valve of claim 17, wherein the hollow cutting member is a 16 gauge needle.

19. The pressure relief valve of claim 14, wherein the bias means is a spring capable of exerting a force of less than about 10 pounds.

20. The pressure relief valve of claim 14, wherein the second valve body is a poppet.

21. The pressure relief valve of claim 20, wherein the poppet is formed of polyetheretherketone.

22. The pressure relief valve of claim 20, wherein the poppet includes a radially tapered outer surface, the radially tapered outer surface having a first outer diameter larger than the diameter of the orifice and a second outer diameter smaller than the diameter of the orifice, the first outer diameter of the poppet capable of engaging and blocking the orifice.

23. The pressure relief valve of claim 22, wherein the radially tapered outer surface defines an angle of about 60 degrees relative to the longitudinal axis of the poppet.

24. The pressure relief valve of claim 14, wherein the orifice is defined by a radial shoulder within the flow path of the first valve body.

25. The pressure relief valve of claim 24, wherein the radial shoulder has a chamfered edge.

26. The pressure relief valve of claim 25, wherein the chamfered edge defines an angle of about 45 degrees relative to the longitudinal axis of the orifice.

27. The pressure relief valve of claim 14, wherein the seal in the longitudinal passage of the second valve body is a frangible membrane.

28. A method of releasing compressed gas from a pressurized system, the method comprising the steps of:

providing a first valve body having a primary flow path for releasing a compressed gas from an interior of the pressurized system, the primary flow path in communication with an interior of the pressurized system;

providing within the primary flow path a movable second valve body having secondary flow path;

blocking the primary flow path with the second valve body;

providing a seal in the secondary flow path in the second valve body;

providing a movable member within the primary flow path adjacent to the seal, wherein the movable member is maintained in a spaced relationship with the seal when the temperature is below a predetermined temperature threshold;

releasing the movable member when the temperature is above a predetermined temperature threshold, wherein the movable member interrupts the seal in the second valve body to expose the secondary flow path; and exposing the primary flow path.

29. The method of releasing compressed gas from a pressurized system of claim 28, wherein the step of providing a seal comprises providing a frangible disc in the secondary flow path in the second valve body.

\* \* \* \* \*

UNITED STATES PATENT AND TRADEMARK OFFICE
CERTIFICATE OF CORRECTION

PATENT NO. : 5,495,865
DATED : March 5, 1996
INVENTOR(S) : LLOYD G. WASS, KURT L. DREWELOW It is certified that error appears in the above-indentified patent and that said Letters Patent is hereby corrected as shown below:

On the title page, item [22] delete "February 28, 1995", insert -- March 28, 1995-- item [57] in the Abstract line 6, delete "popper", insert --poppet--, line 8, delete "popper", insert --poppet--, line 12, delete "popper", insert --poppet--

Col. 4, line 36, delete "popper", insert --poppet--

Col. 6, line 28, delete "beating", insert --bearing--

Col. 6, line 43, delete "beating", insert --bearing--

Col. 9, line 20, delete "carder", insert --carrier--

Signed and Sealed this

Twenty-fifth Day of June, 1996

Attest:

BRUCE LEHMAN

Attesting Officer     Commissioner of Patents and Trademarks